April 10, 1945.   J. R. CLARK   2,373,542
AIRCRAFT CONSTRUCTION
Filed Sept. 26, 1941   2 Sheets-Sheet 1

Inventor
JOHN R. CLARK
By George Douglas Jones
Attorney

April 10, 1945.  J. R. CLARK  2,373,542
AIRCRAFT CONSTRUCTION
Filed Sept. 26, 1941  2 Sheets-Sheet 2

Inventor
JOHN R. CLARK
By George Douglas Jones
Attorney

Patented Apr. 10, 1945

2,373,542

UNITED STATES PATENT OFFICE 2,373,542

AIRCRAFT CONSTRUCTION

John R. Clark, Los Angeles, Calif., assignor to The Glenn L. Martin Company, Baltimore, Md.

Application September 26, 1941, Serial No. 412,355

2 Claims. (Cl. 244—42)

This invention relates to transmission mechanisms and, particularly, transmission mechanisms for aircraft for moving a plurality of control surfaces, such as a flap and a shutter.

In an aircraft wing it is the present practice to pivot a flap near the trailing edge and, selectively, to extend the flap from its normal, substantially horizontal position down through a range of high lift positions to a high drag position. Between the leading edge of the flap and the portion of the wing immediately forward thereof, there is generally provided a slot which passes through the lower surface of the wing and upwardly and rearwardly through the upper surface. A shutter is arranged, usually at the lower end of the slot, for closing the passage while the flap is in normal position and for opening the slot as the flap first moves towards extended positions. It is the object of this invention to provide a transmission mechanism for simultaneously operating the flap and shutter. Specifically, it is intended to provide a transmission for moving the shutter to its slot opening position upon the initial extending movement of the flap, positively to lock the shutter in open position throughout the further, extended movements of the flap and, finally, to move the shutter back to its slot closing position as the flap is returned to normal position, all by means of the transmission mechanism.

It is a further object positively to interlock the mechanism connecting two control surfaces so that certain displacements of one without balancing displacements of the other is virtually impossible. More definitely, it is intended to provide a mechanism which must move the shutter to open position before the flap can be extended substantially and, likewise, which must swing the shutter to slot closing position as the flap finally returns to normal position.

Another object is to provide a mechanism positively to lock the shutter in open position and to hold it against flutter or back draughts down the slot. Especially it is intended to prevent any external forces tending to shake, flutter, or otherwise move the opened shutter from being exerted on the flap and vice versa. That is, when the shutter is up and the flap is down, the force from a backdraught against the shutter will not move the flap in any way, nor will a sudden gust against the flap move the shutter. Furthermore, it is intended by this invention to prevent any such forces from binding or overloading the transmission elements.

The fulfillment of these and other objectives will appear from the following specification and drawings, in which:

Fig. 1 diagrammatically shows a transversely cut-away section of a wing with the transmission in place;

Figure 1:
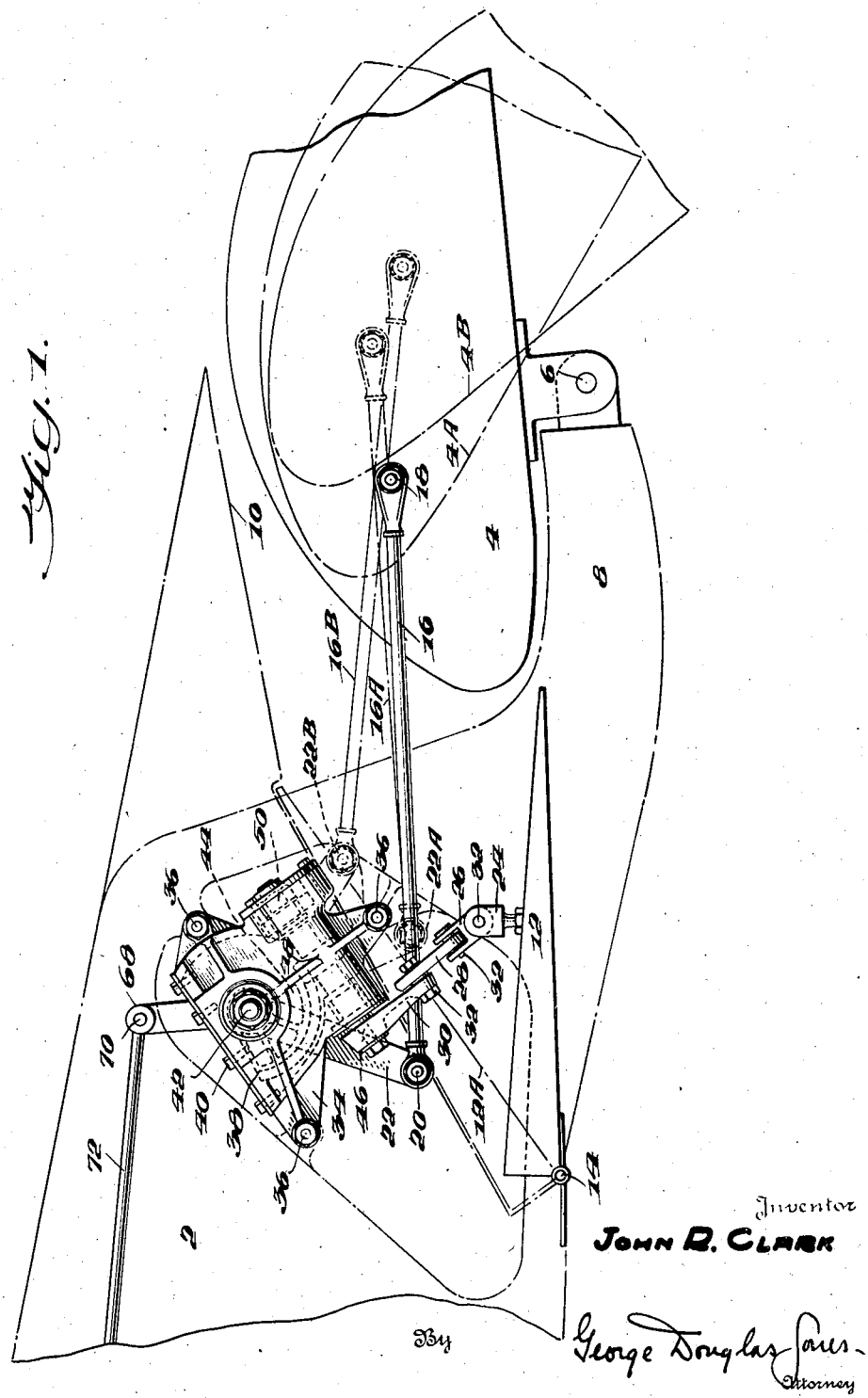

Referring first to Fig. 1, reference numeral 2 designates the rear portion of the main wing of an aircraft having a flap 4 pivoted at 6 to a structural member 8 rigidly affixed to the main body of the wing. Between the flap and the main wing a slot is provided, the front wall of which is diagrammatically indicated at 10, the lower end of the slot being normally closed by shutter 12 pivoted at 14 to structural member 8.

Flap 4 normally extends substantially straight out behind wing 2, but is swingable to lowered positions indicated by dot-dash lines 4A, 4B and positions therebetween to alter the lift and drag characteristics of the airfoil assembly. Downward and upward pivoting of flap 4 is accomplished by the rearward and forward movement, respectively, of push-pull rod 16, which is pivoted at its rear end to the flap at 18 and at its front end at 20 to a crank arm 22.

Shutter 12 normally lies in the position shown in full lines so as to close the lower end of the slot, but upon movement of the flap to position 4A the shutter is retracted against the front wall of the slot to position 12A so as to open the slot. Flap 12 is coupled, through horn 24, shackle 26 and link 28, to a crank arm 30, these coupling members being connected in series by pivots 32.

The invention chiefly concerns the transmission mechanism 34 which is affixed by bolts 36 to structural member 8 and through which crank arms 22 and 30 are driven. Transmission mechanism 34 includes a hollow case 38 formed of sections bolted together, by studs 40, and having therethrough a main shaft 42 rotatably supported by suitable bearings not shown. Crank arm 22 is affixed to shaft 42 so that as the shaft rotates, crank arm 22 is swung to the dot-dash line positions 22A, 22B correspondingly to move push-pull rod 16 and flap 4 to their A and B positions.

As indicated by dash lines in Fig. 1, a toothed segment 44 is keyed to main shaft 42 so as to rotate therewith. Also, indicated by dash lines in Fig. 1 is a driven shaft 46 on which a pinion 48 is affixed, the pinion meshing with the segment. Driven shaft 46 is rotatably mounted by bearings 50, shaft 46 being at right angles to main shaft 42, and has crank arm 30 affixed thereon, so that when main shaft 42 is rotated to a certain angular extent segment 44 drives pinion 48 to rotate shaft 46 to swing crank arm 30 to swing shutter 12.

The means for driving and locking shutter 12, namely, the segment 44 and pinion 48, are shown in detail in Figs. 2 to 5 and Figs. 6 and 7, respectively. Referring first to Figs. 2 to 5, inclusive, segment 44 is provided with a hub 52 having a keyway 54 therein by which it is keyed to main shaft 42. Segment 44 is provided with spokes 56 extending radially from the hub, the end spokes having flanges 58 to prevent overriding of the segment past the pinion. Particular note should be made that segment 44 is provided with helical teeth 60 for only a part of its length, the other part having an arcuate rib 62.

Pinion 48, which is affixed to driven shaft 46, has helical teeth 66 for meshing with teeth 60 of the segment 44 and a transverse slot 67 which is complementary with rib 62 on the segment. When the segment and pinion are affixed on their respective shafts 42 and 46, which are at right angles to one another, the rib 62 on the segment is engaged with slot 67 of the pinion. Then the segment is rotated until the teeth 60 thereof mesh with teeth 66 on the pinion and, simultaneously, the end of rib 62 has passed out of slot 67, thus to unlock the pinion.

A crank arm 68 connected to main shaft 42 of the transmission and pivoted at 70 to rod 72 which, in turn, is connected to a suitable source of power, illustrates one arrangement for exerting motivating force to rotate main shaft 42. Obviously, the flap may be driven by other means, for instance, wherein the driving energy for the shutter is transmitted by the flap itself and to shaft 42 by push-pull rod 16 and crank arm 22. In either instance, the inventive concept, namely, the driving, controlling and irreversibly locking of the shutter by means associated with the flap is utilized.

Figure 2:
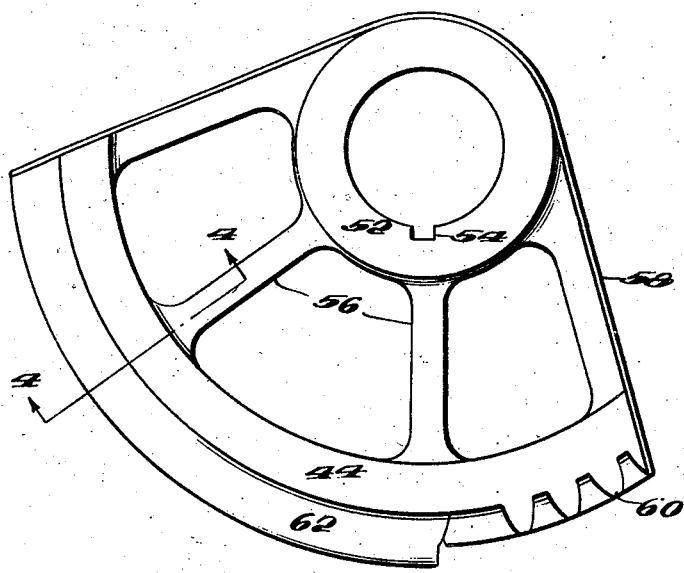
Fig. 2 is a side elevation showing the driving segment in detail.
Figure 4:
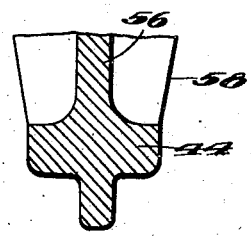
Fig. 4 is a section on line 4—4 of Fig. 2.
Figure 5:
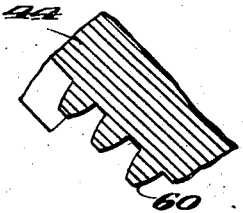
Fig. 5 is a section on line 5—5 of Fig. 3.
Figure 3:
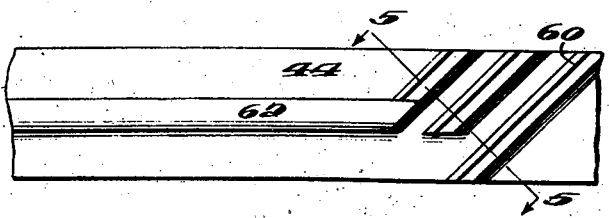
Fig. 3 is a view, from the underside, of a portion of the segment shown in Fig. 2.
Figure 6:
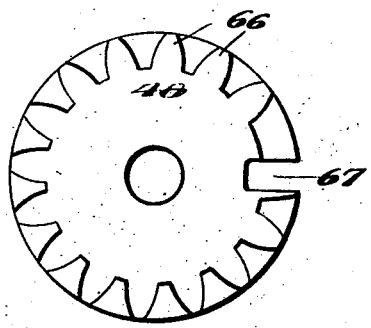
Fig. 6 is a side elevation showing the driven pinion in detail.
Figure 7:
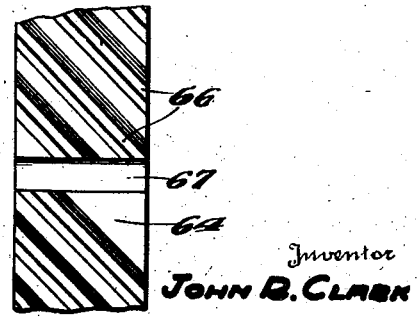
Fig. 7 is an end view of a portion of the pinion shown in Fig. 6.

In operation, when the flap is up and the shutter is down, teeth 60 at the right-hand end of segment 44, as shown in Figs. 1 and 2, are in mesh with teeth 66 of the pinion. The toothed portion of the segment is of sufficient length whereby, upon rotation thereof, to drive pinion 48, shaft 46 and crank arm 30 from the position shown in Fig. 1 to an upper position, thus to retract shutter 12 to position 12A. As the shutter reaches retracted position, rib 62 on segment 44 moves into pinion locking engagement with slot 67 in the pinion. Simultaneously with the retraction of shutter 12, crank arm 22, which rotates with segment 44, shaft 16 and flap 4 move to their respective A positions. From this point on, segment 44, flap 4 and the elements therebetween are free to swing without driving the shutter as rib 62 on the segment sliding through slot 67 establishes a one-way lock on the pinion. However, when flap 4 is raised back past its A position, the end of rib 62 swings out of slot 67 and once again the helical teeth on the segment and pinion are in mesh so that as the flap moves from its A position back to normal, the shutter is accordingly lowered to close the slot.

While the transmission has unique utility in flap and shutter control, it is adaptable to widespread other uses where the disclosed type of relationship between a driving member and a plurality of driven members, or a driving member and a driven member is desired.

Various modifications, applications and substitutions may, of course, be made without departing from the scope of the appended claims.

I claim:

1. In an aircraft wing having a flap and a shutter pivoted thereto, a transmission mechanism for driving the shutter by the initial movement of the flap and for locking the shutter by subsequent movements of the flap comprising a casing mounted in the wing and having first and second shafts mounted therein for rotation about axes at right angles to one another, a helical pinion affixed on the first shaft, said pinion having a slot in the periphery parallel to the axis of said pinion extending inwardly from the working face thereof, a segment-shaped gear affixed on the second shaft and having helical teeth along a peripheral portion and a rib along the remainder of the periphery thereof, said segment-gear is affixed to the second shaft which moves the flaps, said segment-gear drives said pinion until said rib and slot register, and further movement of the segment with the flap locks said pinion and said shutter.

2. In an aircraft, a flap having first and second ranges of movement, a slot, and a shutter movable between two positions for respectively closing and opening said slot, transmission means connecting said flap and said shutter for moving said shutter during the first range of movement of the flap and for locking said shutter during the second range of movement of the flap, comprising a segment gear having helical teeth on a peripheral portion and a rib extending along the remainder thereof, means mounting said gear in said aircraft for rotation about a first axis, means connecting said gear and said flap for rotating said gear in accordance with the movement of said flap, a helical pinion, means connecting said pinion and said shutter for rotation of said shutter in accordance with the movement of said pinion, means mounting said pinion for rotation about a second axis transverse to said first axis, said pinion having helical teeth thereon meshing with the teeth on said gear and a slot in the periphery thereof, extending in the plane of said segment gear, for receiving said rib whereby to prevent rotation of said pinion as said rib moves through said slot in said pinion.

JOHN R. CLARK.